UNITED STATES PATENT OFFICE.

EMIL PAUL SCHOENFELDER AND EMIL KEHLE, OF NEWARK, NEW JERSEY.

SELF-TONING SENSITIVE PHOTOGRAPHIC PAPER.

SPECIFICATION forming part of Letters Patent No. 560,756, dated May 26, 1896.

Application filed October 25, 1895. Serial No. 566,896. (No specimens.)

*To all whom it may concern:*

Be it known that we, EMIL PAUL SCHOENFELDER and EMIL KEHLE, citizens of the United States, residing in Newark, county of Essex, and State of New Jersey, have invented certain new and useful Improvements in Chemical Compositions for Photographic Purposes; and we do hereby declare the following to be a full, clear, and exact description of the invention, such as will enable others skilled in the art to which it appertains to make and use the same.

Our present invention is an improvement on the chemical compound or composition covered by our application for United States Letters Patent, Serial No. 558,783, filed August 9, 1895.

The object of the invention is to provide a chemical compound or composition for the preparation of paper, especially glazed paper, porcelain, or any other suitable material on which photographic prints are to be made from a negative plate, whereby a uniform toning of the picture is accomplished simultaneously with the printing, and thus the toning, after the print is made, is fully avoided.

Our composition consists of the following ingredients, combined in the proportions stated, and which we will call "stock" or "ground" solution, viz:

Stock solution A, (collodion:) pyroxylin, three hundred grains; ether, (*United States Pharmacopœia,* 1880,) one pound; alcohol, absolute, one pound.

Stock solution B: fifteen grains of a chlorid of a metal of the platinum class, such as iridium chlorid, rhodium chlorid, osmium chlorid, palladium chlorid, or platinum chlorid, said fifteen grains of chlorid being dissolved in one-half ounce of alcohol. Forty per cent. gold chlorid is not mentioned, as it is covered by the application above referred to.

One and one-half ounces of stock solution A are thoroughly mixed with ten drops of stock solution B, and the following ingredients are added in the proportions stated, viz: (*a*) tartaric acid, three grains, which are dissolved before mixing with the other ingredients in three drops of alcohol; (*b*) fifteen grains of silver nitrate, first dissolved in fifty drops of forty per cent. alcohol; (*c*) one and one-half grains of a chlorid, such as strontium chlorid, or barium chlorid, or of zirconium chlorid, dissolved before mixing with the other ingredients in three drops of forty per cent. alcohol, and (*d*) two drops of a softening chemical, such as glycerin.

The above emulsion is applied to the surface of the material on which the picture or photo is to be printed. The surface must be thoroughly dried before using. After the print has been made it is given a bath in a solution of sodium hyposulfite one part to fifteen parts of water, in which bath it remains until all superfluous chemicals have been removed from the picture, (about five minutes,) when it is taken out and thoroughly washed in clean water. The picture is then ready for mounting, and as the toning has been accomplished simultaneously with the printing it does not require any additional toning and has a superior finish that will not fade or turn yellow by being exposed to light.

In place of stock solution A a solution can be used composed of gelatin one part and water three parts, in which case the ingredients mentioned under (*a*), (*b*), and (*c*) are dissolved in water instead of in alcohol.

It should be understood that we waive in the present application all claim to gold chlorid and citric acid, as these are covered by the application above referred to.

Having thus described our invention, what we claim as new, and desire to secure by Letters Patent, is—

1. A chemical composition to be used for preparing the surface of suitable material for photographic prints, consisting of chlorid of platinum, of silver nitrate, a holding substance, and tartaric acid, substantially as described.

2. A chemical composition to be used for preparing the surface of suitable material for photographic prints, consisting of a salt of platinum, of silver nitrate, a holding substance, such as collodion, tartaric acid, and glycerin, substantially as described.

3. A chemical composition to be used for preparing the surface of suitable material for photographic prints, consisting of a holding substance, such as collodion, a salt of platinum, of silver nitrate, a chlorid, such as strontium chlorid, a softening ingredient, such as glycerin, and tartaric acid, substantially as described.

In testimony that we claim the foregoing we have hereunto set our hands this 19th day of October, 1895.

EMIL PAUL SCHOENFELDER.
  EMIL KEHLE.

Witnesses:
 ALFRED GARTNER,
 WM. D. BELL.